April 15, 1924.

T. B. WYLIE

MAXIMUM DEMAND FLUID REGULATOR

Filed April 24, 1920

Inventor

Thomas B. Wylie

By Bakewell, Byrnes & Parmelee his Attorneys

Patented Apr. 15, 1924.

1,490,654

UNITED STATES PATENT OFFICE.

THOMAS B. WYLIE, OF HAYSVILLE, PENNSYLVANIA.

MAXIMUM-DEMAND FLUID REGULATOR.

Application filed April 24, 1920. Serial No. 376,298.

*To all whom it may concern:*

Be it known that I, THOMAS B. WYLIE, a citizen of the United States, residing at Haysville, in the county of Allegheny and State of Pennsylvania, have invented a new and useful Improvement in Maximum-Demand Fluid Regulators, of which the following is a full, clear, and exact description.

The present invention relates to maximum demand fluid regulators. Fluids, such as gas, are often sold to the customer on the basis of a maximum demand, the customer getting a certain rate on condition that the demand for gas shall never exceed a certain predetermined maximum. The present invention relates particularly to a regulator inserted in the supply pipe which will automatically regulate the flow and prevent it from exceeding the maximum demand.

Figure 1:
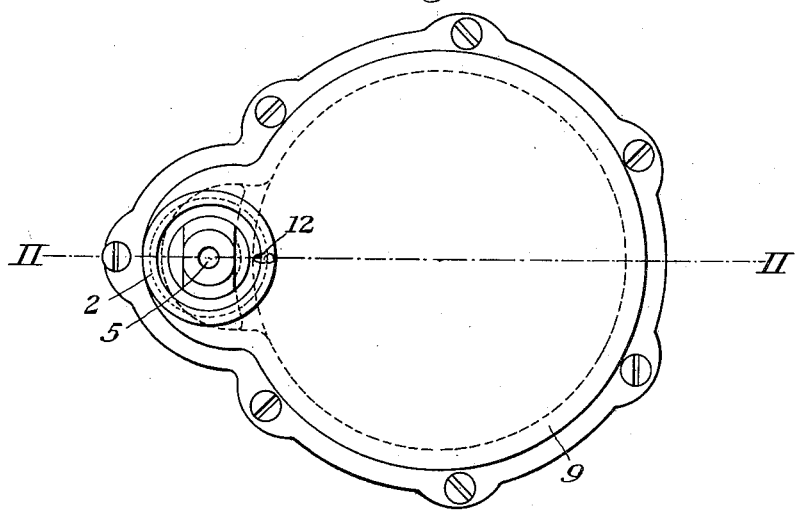
Figure 2:
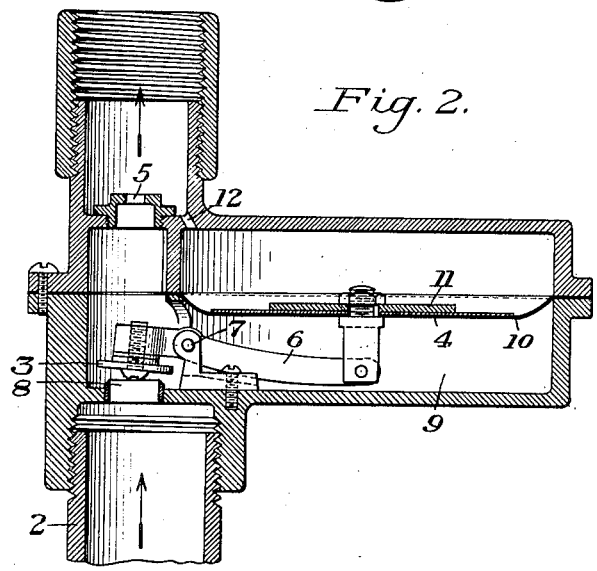

Referring to the drawings which illustrate the preferred embodiment of the invention, Figure 1 is a plan view of the regulator, and Figure 2 is a central vertical section along the line II—II of Figure 1.

Referring to the illustrated embodiment of the invention, the regulator is inserted in the gas supply pipe 2, through which the gas is flowing upwardly as indicated by the arrows. The regulator comprises a throttle valve 3, an actuating diaphragm 4 and a restricted orifice 5. The diaphragm 4 is subjected to the differential pressure across the orifice 5.

The valve 3 is carried on the end of a valve lever 6 pivotally mounted at 7 and closed downwardly against the flow of gas and against the valve seat 8. The other end of the lever 6 extends into a diaphragm chamber 9 which extends to one side of the pipe 2. The diaphragm 4 extends horizontally across the chamber 9 and is connected to the long arm of the lever 6. The diaphragm 4 comprises a sheet of flexible material 10 and a weight 11 which is preferably made removable. The weight 11 holds the diaphragm 4 down and thus maintains the valve 3 open by gravity. The gas after passing the throttle valve 3, passes through a restricted orifice 5. The diaphragm 4 is subjected on its lower side to the pressure on the inlet side of the orifice 5 and at its upper side is subject to the pressure by means of the passage 12 at the outlet side of the restricted orifice 5. The diaphragm is therefore subject to the differential pressure between the two sides of the restricted orifice 5. This differential pressure is a function of the flow of the gas fluid through the orifice 5. The orifice 5 is preferably made removable, as shown, so that the regulator may be adjusted to various predetermined maxima.

The operation of the device is as follows:— The gas flows upwardly through the pipe 2, as indicated by the arrows, through the valve 3 and the restricted orifice 5. When the flow of gas is below the maximum demand, the valve 3 is maintained open since the differential pressure across the orifice 5 is insufficient to raise the weighted diaphragm 4. Should, however, the consumer endeavor to draw more gas than the maximum demand for which the regulator is set, the differential pressure across the orifice 5 will increase to a point where the diaphragm 4 will be raised and thus partially close the valve 3 and throttle the flow of gas. The regulator does not shut off the flow of gas entirely but throttles it so that the flow of gas can never exceed the predetermined maximum.

The regulator is small and compact and has a few parts to get out of order. The valve 3 is pivoted so that it closes against the gas pressure, thus preventing chattering of the valve. The lever arms of the lever 6 are so arranged that the diaphragm gives ample force to close the valve against the gas pressure.

While the present invention has been illustrated and described in connection with a maximum demand meter designed particularly for gas, it may be employed for regulating other fluids. It is to be understood, therefore, that the present invention is not limited to its illustrated embodiment but may be embodied in other structures within the scope of the following claims.

I claim:

1. A maximum demand fluid regulator, comprising a valve closing against the flow of the fluid, and means for actuating the valve comprising a pivoted valve lever, a restricted orifice, and a diaphragm operatively connected with the valve lever and subject to the differential pressure between the two sides of the orifice; substantially as described.

2. A maximum demand fluid regulator, comprising a substantially vertical passage through which the fluid flows upwardly, a downwardly closing valve and a restricted orifice in said passage, and the diaphragm chamber at one side of the passage and the diaphragm therein, having its upper and lower sides subject to the pressures at the upper and lower sides, respectively, of the orifice, and a pivoted lever connected at its opposite ends to the valve and the diaphragm, respectively; substantially as described.

3. A maximum demand fluid regulator, comprising a valve, and means for actuating the valve upon an abnormal increase in flow beyond a predetermined maximum, including a restricted orifice through which the fluid flows, a flexible diaphragm operatively connected with the valve and weighted with a removable weight so as to normally maintain the valve wide open, and passages from the upper and lower sides of the diaphragm to the outlet and inlet sides, respectively, of the orifice, substantially as described.

4. A maximum demand fluid regulator, comprising a valve normally wide open, means for actuating the valve upon an abnormal increase in flow beyond a predetermined maximum, including a removable restricted orifice not accessible to the user, and a diaphragm subject to the differential pressure between the two sides of the orifice, substantially as described.

In testimony whereof I have hereunto set my hand.

THOMAS B. WYLIE.